United States Patent

Ma et al.

Patent Number: 6,151,295
Date of Patent: Nov. 21, 2000

[54] OFDM RECEIVING SYSTEM

[75] Inventors: Steve Ma, Pointe-Claire; Donovan Young; Jiang Lei Ma, both of Montreal, all of Canada

[73] Assignee: Wavesat Telecom Inc., Ville St-Laurent, Canada

[21] Appl. No.: 09/030,865

[22] Filed: Feb. 26, 1998

[51] Int. Cl.[7] .................................................. H04J 11/00
[52] U.S. Cl. ........................................ 370/203; 370/503
[58] Field of Search ................................... 370/203, 208, 370/503, 509, 510, 512, 504, 514; 375/229, 260

[56] References Cited

U.S. PATENT DOCUMENTS

| | | | |
|---|---|---|---|
| 4,796,280 | 1/1989 | Yoshida | 375/116 |
| 5,191,576 | 3/1993 | Pommier et al. | |
| 5,274,629 | 12/1993 | Helard et al. | |
| 5,307,376 | 4/1994 | Castelain et al. | |
| 5,345,440 | 9/1994 | Gledhill et al. | |
| 5,406,551 | 4/1995 | Saito et al. | |
| 5,416,767 | 5/1995 | Koppelaar et al. | |
| 5,416,801 | 5/1995 | Chouly et al. | |
| 5,440,585 | 8/1995 | Partridge, III | |
| 5,444,697 | 8/1995 | Leung et al. | |
| 5,471,464 | 11/1995 | Ikeda | |
| 5,548,582 | 8/1996 | Brajal et al. | |
| 5,596,582 | 1/1997 | Sato et al. | |
| 5,602,835 | 2/1997 | Seki et al. | |
| 5,617,411 | 4/1997 | Mueller | |
| 5,652,772 | 7/1997 | Isaksson et al. | |
| 5,901,180 | 4/1999 | Aslanis et al. | 375/261 |
| 5,914,931 | 6/1999 | Kang et al. | 370/203 |
| 5,914,933 | 6/1999 | Cimini et al. | 370/208 |
| 6,061,327 | 4/2000 | Demoulin et al. | 370/208 |

FOREIGN PATENT DOCUMENTS

| | | |
|---|---|---|
| 0 689 313 | 12/1995 | European Pat. Off. |
| 0 689 314 | 12/1995 | European Pat. Off. |
| 2 310 980 | 3/1997 | United Kingdom |

OTHER PUBLICATIONS

Vittoria Mignone et al: "CD3–OFDM: A Novel Demodulation Scheme For Fixed and Mobile Receivers"—IEEE Transactions on Communications. vol. 44, No. 9, Sep. 1996, pp. 1144–1151.

Ph.J. Tourtier et al: "Multicarrier Modem for digital HDTV Terrestrial Broadcasting"; Elsevier Science Publishers B.V.: Signal Processing Image Communication; Dec. 5, 1993, Nos. 5/6; pp. 379–403.

Keller T. et al: "Orthogonal Frequency Division Multiplex Synchronisation Techniques for Wireless Local Area Networks"—IEEE International Symposium on Personal, Indoor and Mobile Radio Communications, vol. 3, Oct. 15, 1996, pp. 963–967.

*Primary Examiner*—Douglas W. Olms
*Assistant Examiner*—Kenneth Vanderpurge
*Attorney, Agent, or Firm*—James Anglehart; Swabey Ogilvy Renault

[57] ABSTRACT

A method of frame synchronization for OFDM point-to-multipoint channels is provided according to a first aspect of the invention, wherein sequences of reference frames are inserted at prescribed intervals between sequences of information frames. Each frame comprises a cyclic prefix, composed of two identical segments of data, which is used for locating a frame synchronization starting point by applying a subtraction function on the two segments of data for locating the starting point at the location of the minimum of the function. A method of channel equalization for OFDM channels is also provided according to a second aspect of the invention, wherein the reference frames and data known to a receiver are used for creating an equalization vector for correcting broadcast errors of the information frames received at the receiver side.

23 Claims, 7 Drawing Sheets

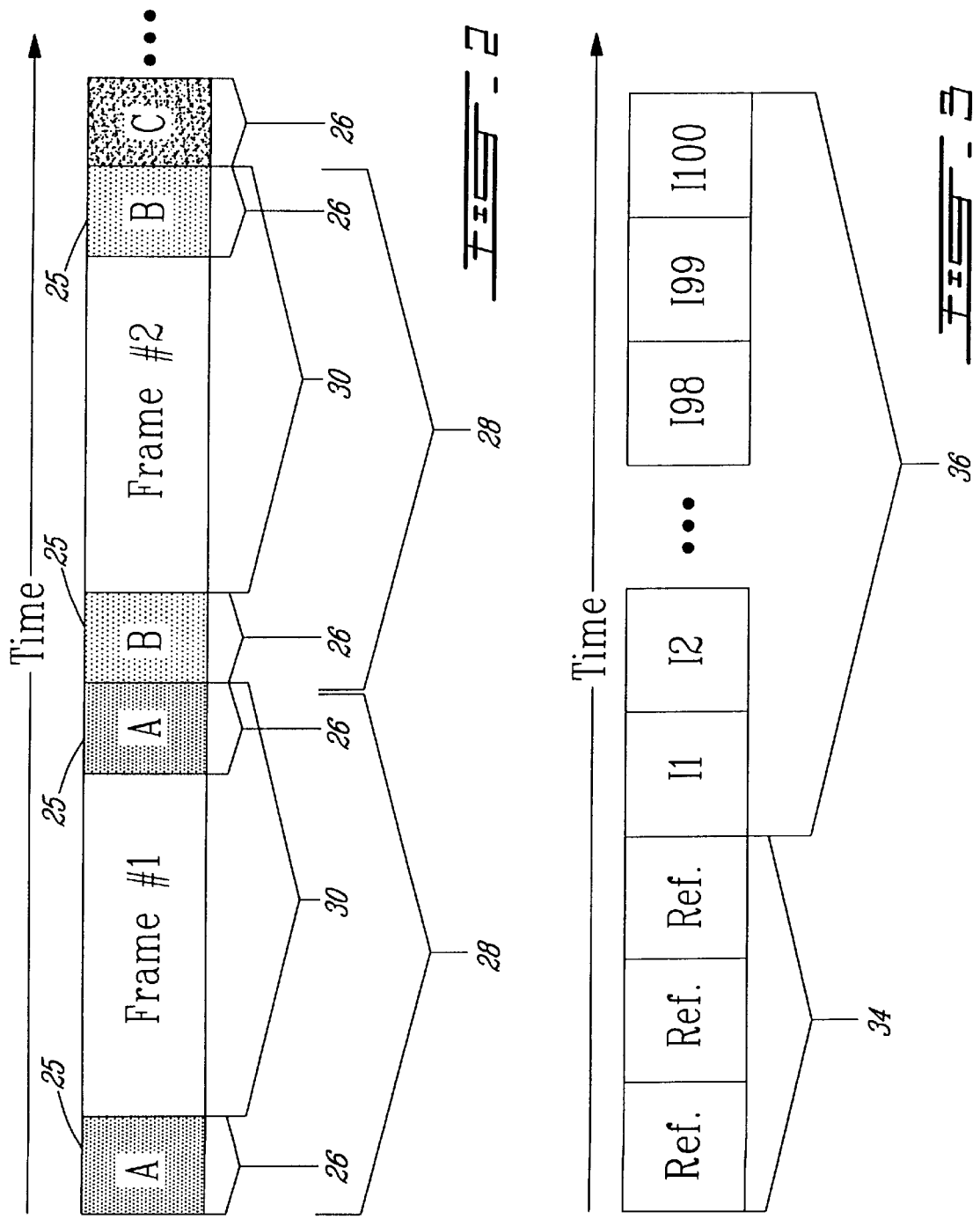

Data Frames in
Strip Cyclic Prefix From Data Frame
Multiply by Frequency Offset Correction
FFT on each Data Frame
Equalize Data Frames with Equalization Vector
De-Map and Output Data
Corrected Data Frames Output
FIG. 7

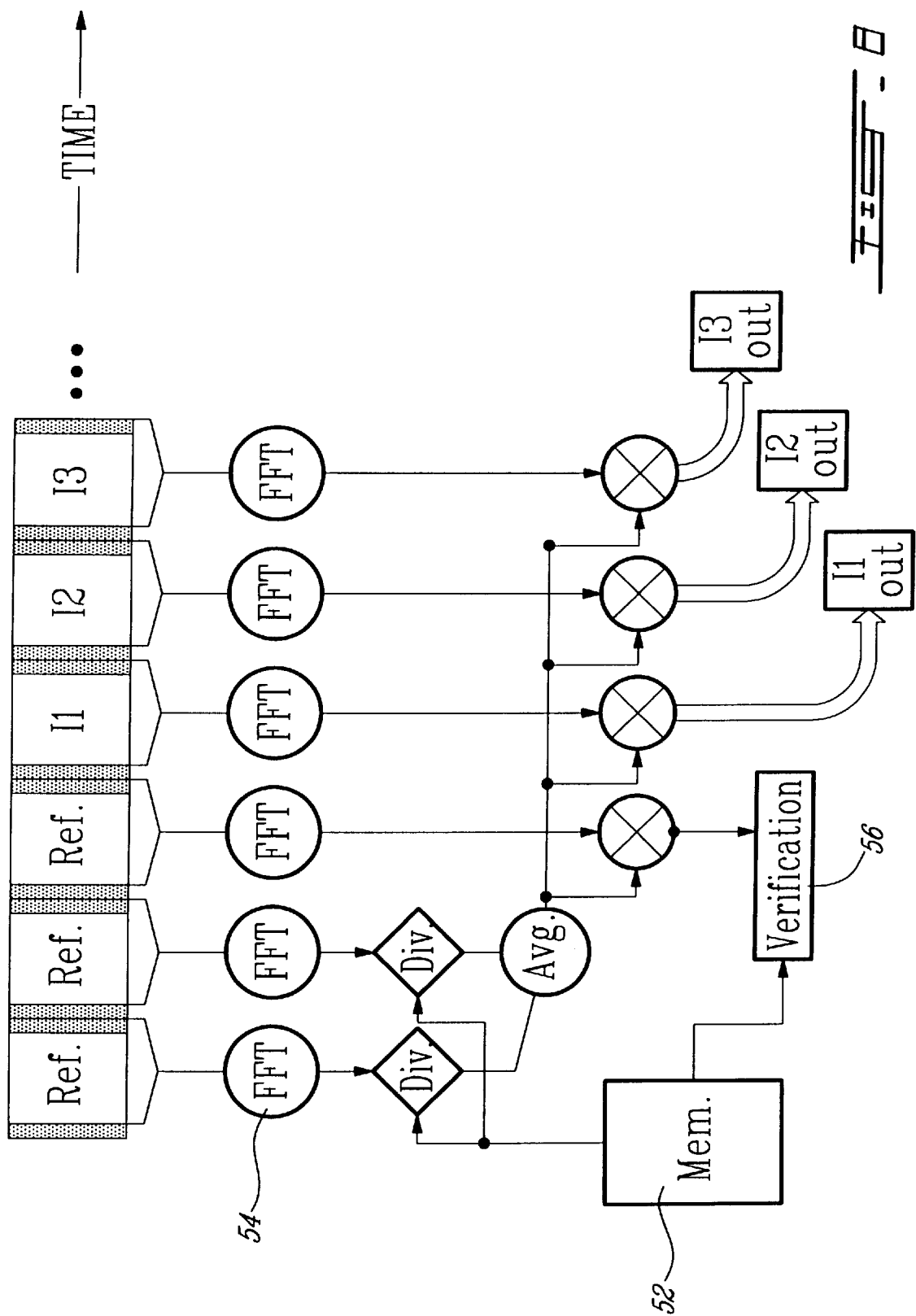

OFDM RECEIVING SYSTEM

FIELD OF THE INVENTION

This invention relates to channel equalization and frame synchronization for Orthogonal Frequency Division Multiplexing (OFDM) data broadcast for non-mobile transmitters and receivers.

BACKGROUND OF THE INVENTION

In recent years, telecommunications technologies became a field of the industry having one the greatest expansions ever. This is caused by the ever-increasing demand to broadcast larger amounts of data that require higher bandwidth of the telecommunication channel. One of the proposed wireless technologies that provides such a broad bandwidth is a modulation technique called the Orthogonal Frequency Division Multiplexing (OFDM) and which has been recently suggested for use in a digital video non-mobile broadcasting. OFDM appears to be a powerful means of providing a power efficient signaling for a large number of users on the same channel.

The basic idea of OFDM is to transmit blocks of data in parallel by employing a large number of orthogonal subcarriers.

Although OFDM transmission is an accurate modulation technique compared to other broadcasting techniques, there are two problems associated with it: one is frame synchronization and the other is channel equalization. In OFDM data is broken up into individually modulated sections called frames. These frames are strung together in a continuous manner and transmitted over an OFDM channel. It is of utmost importance for the receiver to know precisely where the frames begin a nd end, in order to recover the valuable data. Finding these beginnings and endings of the frames is what is known as frame synchronization. Various techniques of performing frame synchronization exists, but they usually involves adding data flags for marking the beginning or the ending of the frames. This is done at the expanse of adding portions of data that slow down the speed of transmitting valuable data.

Because OFDM channels sometimes distort the data they carry to the point that it is thoroughly unrecognizable, a scheme to correct any channel distortion is required. Such equalization techniques exist, but they often require the data correction to be done at the transmitter side so the state of the channel has to be known to the transmitter. Furthermore, these techniques do not apply to point to multipoint OFDM transmission since multiple paths are involved, each having its own different response.

It has to be noted that throughout the present application the term OFDM channel is used to designate the air path of the electromagnetic waves representing OFDM frames to be transmitted from a transmitting system to a receiving system. When a channel involves multiple receivers that capture the same transmitted signal, the present application refers to point-to-multipoint channel.

SUMMARY OF THE INVENTION

It is therefore an object of the present invention to provide a method and an apparatus for performing accurate OFDM frame synchronization by appending a small portion of each OFDM frame to be transmitted to its own beginning, thus creating a cyclic prefix for each frame. This cyclic prefix is then used at the receiver side for finding the beginning of the received OFDM frames.

It is another object of the present invention to provide a powerful method of accurately equalizing the OFDM frames received over an OFDM channel. This method does not require the transmitter to know anything about the OFDM channel conditions so that it can be used for point to multipoint OFDM data broadcasting.

In a preferred embodiment of the present invention, the transmitted OFDM information frames include reference frames, inserted at predetermined intervals, and these reference frames contain data known to the receiver. Upon receipt of these frames, the receiver uses them in order to collect data about the state of the OFDM channel. Having this information available, the receiver creates a correction or equalization vector, which is then multiplied with each of the information frames received in order to eliminate the undesirable effect of OFDM channel distortions. The end-result frames are verified for accuracy by multiplying the correction vector with a distorted reference frame and if the end-result is the accurate enough, the correction vector is considered to be reliable and may be used for correcting all subsequent information frames received. If the correction vector is inaccurate, another equalization vector may be created using other reference frames. If the vector is still inaccurate, then some pilot tones, consisting in very small samples of data known to the receiver and contained in the information frames, may further be used for updating the correction vector, for better results.

In order to perform the channel equalization, accurate OFDM frame synchronization is needed. Thus, it is another object of the present invention to provide a method of OFDM frame synchronization that uses a cyclic prefix and that consists of appending to the beginning of each frame sent by the transmitter a small part of its last part. This serves two functions, the first being to protect frames from the impulse response spill-over generated by the previous frame, thus fortifying the system against ISI (Inter-Symbol Interference) and the second, to provide a method of accurate frame synchronization by using these cyclic prefixes for determining the exact locations of the beginning of the received OFDM frames.

According to a first broad aspect of the present invention, a method of frame synchronization for OFDM channels is provided, wherein a frame synchronization starting point is to be located within an incoming data bit stream signal having repeated portions of data at predetermined intervals, wherein the method comprises the steps of:

a) subtracting data collected from two points of said bit stream signal separated by a predetermined number of bits;

b) detecting when said data is identical at said two points of said bit stream;

c) obtaining said frame synchronization starting point from a result of step b).

According to a second broad aspect of the present invention, a method of channel equalization for point-to-multipoint OFDM channels is provided, wherein the method is performed at a receiver side of an OFDM channel and comprises the steps of:

a) receiving an incoming data bit stream signal comprising interleaved sequences of reference and information frames, each of said reference frame containing data known to a receiver;

b) detecting said reference frames in said incoming data bit stream signal of OFDM frames;

c) transforming said incoming stream of OFDM frames from a time domain to a frequency domain;

d) creating a correction vector using said sequence of reference frames and data known to a receiver for correcting broadcast errors created by distortions caused by said OFDM channel;

e) correcting each information frame from said sequences of information frames received at said receiver using said correction vector for countering a distortion effect of said OFDM channel on said frames.

BRIEF DESCRIPTION OF THE DRAWINGS

The present invention is described and will be better understood with reference to the following drawings, in which:

FIG. 2 shows the cyclic prefix for two consecutive frames.

FIG. 3 represents a typical sequence of information frames preceded by a sequence of three reference frames used for frame synchronization at the receiver side;

FIG. 7 shows the information frame processing according to a preferred embodiment of the invention;

FIG. 8 shows a detailed view of a preferred embodiment of the present invention related to the channel equalization;

DESCRIPTION OF THE PREFERRED EMBODIMENTS

In a preferred embodiment of the present invention there is provided a method for OFDM frame synchronization and channel equalization that allows accurate transmission of OFDM data without the need for the transmitter to know anything about the state of the channel. This method is especially suited for wireless non-mobile point-to-multipoint broad band data transmission, where multiple channels are involved, each having its own different response.

Figure 1:
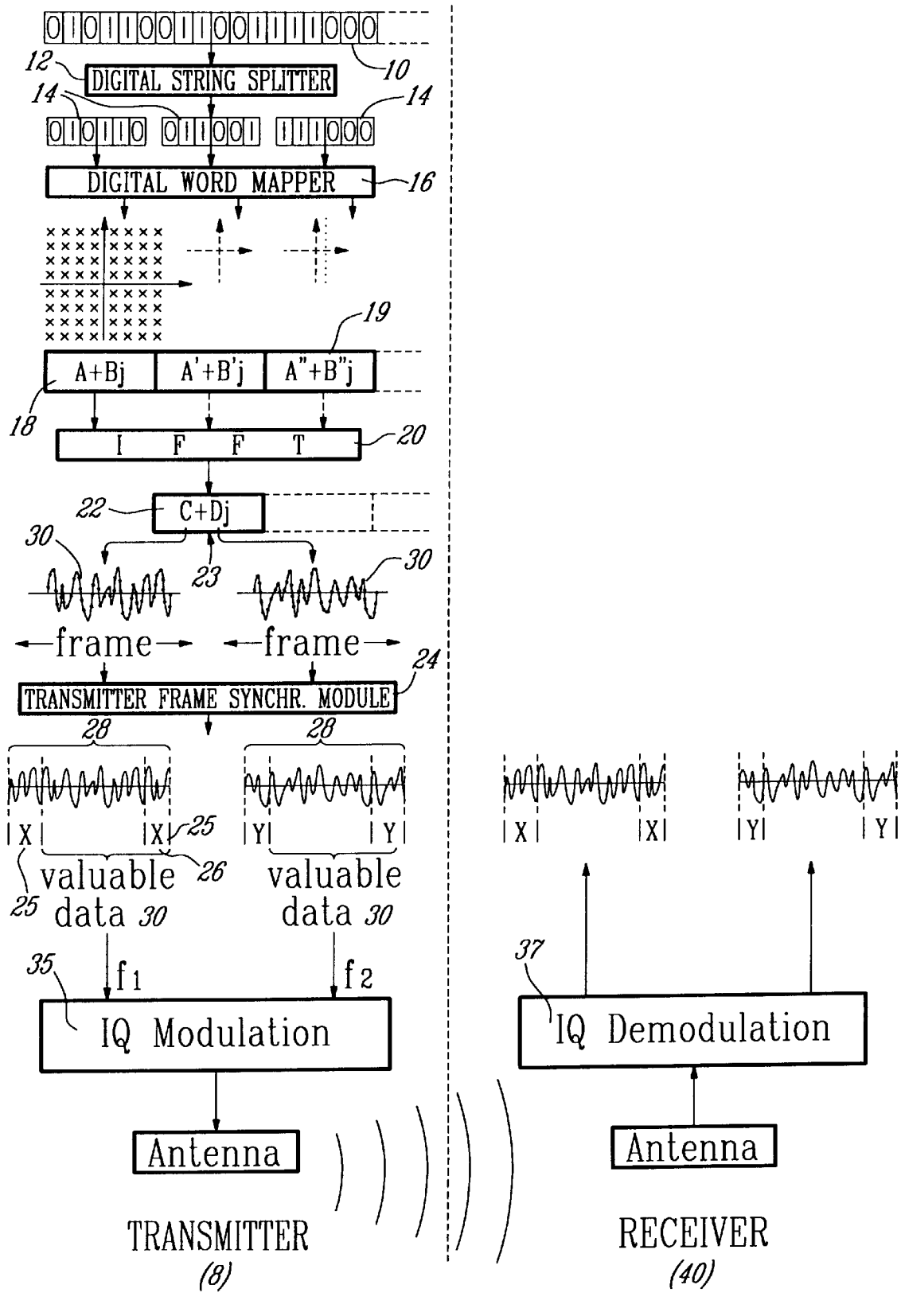
FIG. 1 shows a preferred embodiment of the present invention related to the frame synchronization.

A preferred embodiment of the present invention related to the frame synchronization is partially illustrated in FIG. 1. This figure shows the prior art technique of OFDM modulation at the transmitter side and the demodulation of data at the receiver side. However, FIG. 1 also comprises objects of the present invention which will be described in the following lines. First, at the transmitter's side, a common string of bits 10 representing the valuable data to be transmitted from one point to another is fed into a digital string splitter 12 which splits the bit string 10 into separate words of bits 14, each having a pre-determined length. In our example, words of 6 bits are used. Then, each word 14 is processed by the digital word mapper module 16 which maps that word into the complex plane to one of the possible states of the word. Since the word 14 is 6 bit long, $2^6=64$ states are possible, so each of the four quadrants of the complex plane comprises 16 possibilities. The result of this step is a complex number 18 of the form A+Bj which represents the processed 6 bit word 14. Data words are successively put into an array 19, thus forming a one-dimension array 19 of words 18 which has the dimension of one frame of information. Then, an Inverse Fast Fourier Transform (IFFT) module 20 receives as an input a series comprising the real parts of the complex numbers 18 and the imaginary parts of that same complex numbers 18 and performs on that series an IFFT. The result is a Fourier transformation that creates an interleaved time series of data, so that the input series is converted from the frequency domain into the time domain. The output of the IFFT module 20 is a time series of complex numbers 22 of the form C+Dj wherein the first index represents the real parts C and the second the imaginary parts D. Each of these indices C and D represents the valuable portion of a data frame 30, as shown in FIG. 1. As before, a one-dimension complex array 23 contains all the complex numbers 22 which result from the IFFT operation. Since the time series represents 1024 consecutive words, the output of the IFFT module 20 is a pair of data frames 30, each representing 1024 words 14. The frame 30 has the form of an analog curve as shown in FIG. 1, but is in fact represented by a series of discrete points, each having its coordinates in a digital representation. This is common OFDM processing and is known in the prior art.

Frame Synchronization

The next step of the method shown in FIG. 1 is a preferred embodiment of the present invention and relates to the frame synchronization. Frame synchronization means that the receiver has to detect a reference throughout the incoming data bit signal that indicates the beginning of the frames. Therefore, in a preferred embodiment of the invention, at the transmitter's side, each frame 30 comprising the valuable data to be transmitted enters a transmitter frame synchronization module 24 whose function is to add a reference in front of each frame in order to allow the receiver to detect the beginning the frames. FIG. 2 shows a better view of the frames comprising a cyclic prefix 25 composed of two identical segments 26. One of the novel features of the present invention resides in the fact that, each frame 30 to be transmitted, is transformed in such a way that a segment of data 26 of the frame is copied and appended to the beginning of the frame thus creating a longer frame 28, than the valuable data segment 30 that contains the useful data. This segment of valuable data 30, contains the useful data to be transmitted from a transmitter to one or more receivers. When the cyclic prefix is created, a small data segment 26 having preferably approximately 10% of the length of the valuable data portion 30 is copied and appended to the beginning of the portion 30, thus increasing the length of the frame by 10% only. The process of creating a cyclic prefix 25 is performed on both the reference frames and the data frames and the result is that each transmitted frame begins and ends by the same segment of data 26. These identical segments 26 inside a frame 28 are used at the receiver side in order to detect the beginning of the frames, in a manner which is disclosed in detail further in this text.

In a preferred embodiment of this invention, the transmitter preferably sends out at prescribed intervals sequences of three consecutive reference frames 34 between sequences of about 100 information frames 36. All reference frames contain identical data which is known to the receiver and these reference frames are used for frame synchronization purposes. An example of frame sequences sent out by the transmitter 8 is illustrated in FIG. 3.

Figure 4:
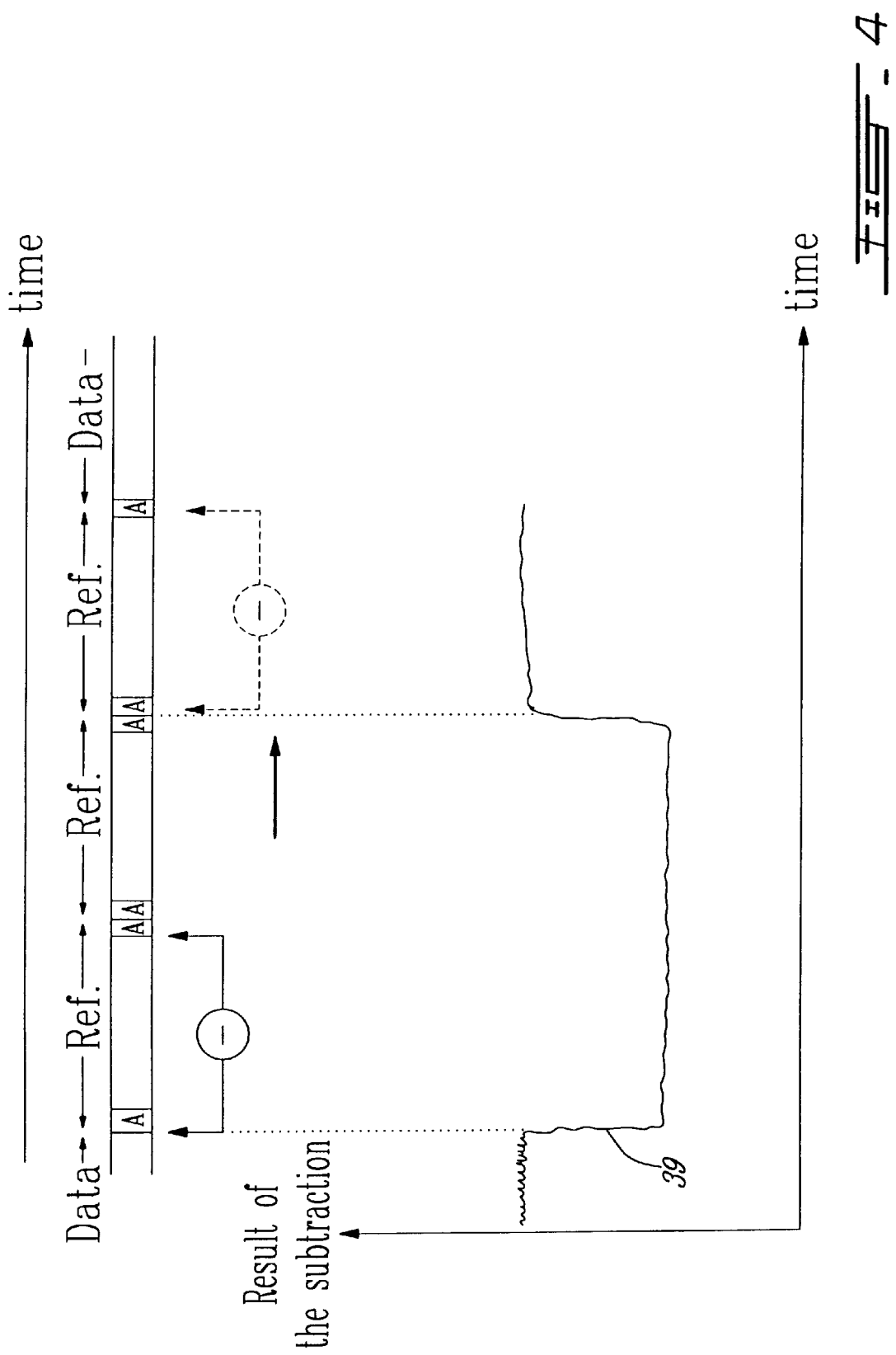
FIG. 4 shows the application of the window or subtraction function on a sequence of incoming OFDM frames for roughly detecting the sequence of reference frames.

In a preferred embodiment of the present invention, the receiver frame synchronization module 32 must perform two tasks, the first is to locate the sequence of reference frames 34 between two sequences of information frames 36 and the second is to precisely locate the first sample of data of the first reference frame 34 of that sequence of reference frames. Accurate detection of the beginning of the reference frames is needed in order to subsequently perform channel equalization. As mentioned above, the reference frames 34 are frames of information known to the receiver 40 and are preferably sent by the transmitter 8 in sequences of three consecutive frames, at prescribed intervals among the information frames 36, as shown in FIG. 3. Other sequences comprising more or less reference frames may be used as well. The receiver 40 may use a frame synchronization module 38 in order to detect the location of the reference frames 34 by comparing sequences of data from the beginning and the end of the frame, separated by a length equivalent or bigger than a length of a frame. The principle, shown in FIG. 4, is to apply a subtraction between the two sections of data, one at the beginning of the reference frame 34 and the other at its end, which are supposed to be identical. In fact the two sequences are no longer identical, but only close to be, since the OFDM channel have distorted the data during the broadcast. This distortion is a difference in the form of the data between the transmitted data and the received data. Most part of the distortion takes place over the air transmission of the electromagnetic waves, while a small part of the distortion is due to the local oscillators from the IQ modulator 35 and the IQ demodulator 37 as well as from other electronic components.

The subtraction function is applied on all the range of the sequence of three reference frames, as shown in FIG. 4, and produces a minimum at the location of the first two reference frames from a sequence of three reference frames.

First, a rough reference frame detection is performed. The presence of the sequence of three reference frames 34 is detected using an algorithm based on the following window function, or subtraction function:

$$W(x) = \sum_{i=0}^{k} [D(x+i) - D(x+i+N)]$$

where x is the sample index, k is an arbitrary "window size", D is the data set and N is the number of samples in one or more frames of data.

Figure 5:
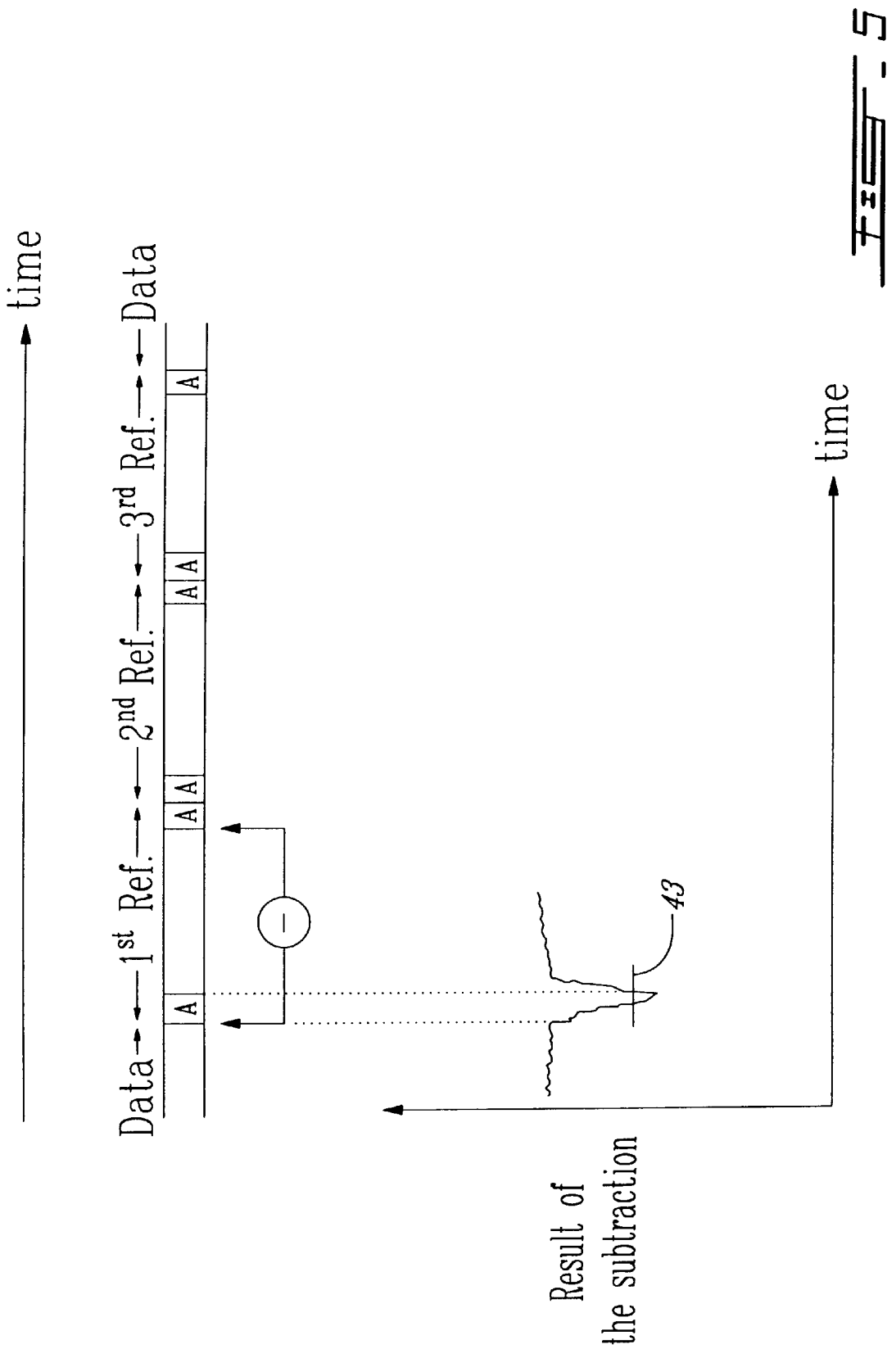
FIG. 5 shows a preferred embodiment of the invention related to the fine reference frame search.

When the routine locates the location of the falling edge of the function W(x), it finds the location of the sequence of reference frame 34 only roughly. The purpose of this first searching routine is to locate the falling edge 39 of the subtraction function curve only roughly. Another routine is then employed to precisely find the location of the first sample of data of the reference frames 34. This is accomplished using a process similar to the one used at first. As it was mentioned above, at the transmitter's side, an ending segment 26 of each frame 22 is copied and appended at the beginning of that frame 22, thus creating a cyclic prefix 25 as shown in FIG. 2. The cyclic prefix 25 comprises the two identical segments of data 26, one being located at the beginning of the frame while the other is located at the end of the frame. The cyclic prefix 25 serves two functions: the first one is to protect frames from the impulse response spill-over generated by the previous frame, thus fortifying the system against ISI (Inter-Symbol Interference); the second and more crucial to frame synchronization is to provide a method of applying a variant of the W(x) function, call it w(x), such that w(x) encounters a minimum at the beginning of a reference frame 10. w(x) is then of the same form as W(x) but has different parameters: k is now the length in samples of the cyclic prefix, D is the input data set, N is the length in samples of one frame minus the extra part donated by the cyclic prefix and x remains the data index. This second routine is illustrated in FIG. 5 and resemble to the first routine with the difference that it is only applied onto the first reference frame 34 of the sequence of reference frames. Its purpose is to trace a curve of the comparison between the two segments 24 of the cyclic prefix 25 of that frame. Since those two segments 26 are supposed to be identical, the routine would have a minimum 43 at the location of the best match. That location is detected and is used as a frame synchronization starting point for reading the subsequent data. The two routines, used consecutively in combination with each other detect precisely the true beginning of the first reference frame 34 in a sequence of frames.

In a preferred embodiment of the present invention, the rough reference frame search and the fine reference frame search are only performed when the receiver is turned on, until the frame synchronization starting point is found. Once this is done, the processor may keep track of the beginning of each subsequent frame, since all frames have a predetermined length, so these steps may be skipped after the initialization of the receiver. However, when distortions reach a point where keeping track of the beginning of the frames is no longer possible, the process of resetting the receiver and redoing the search for the beginning of the reference frames may be restarted.

After having performed the rough reference frame search and the fine reference frame search, a time domain correlation algorithm may be applied to the reference data in order to correct the frequency offset, which is a data distortion phenomena caused by the small variations of the local oscillators from the transmitter and receiver's sides. The principle is to perform a correlation between the first and the second reference frame in the time domain, by using a correlation coefficient ϵ in the time domain. The quantity ϵ is defined as:

$$\epsilon = \angle[\gamma/(2\pi)]$$

where $\angle[\alpha]$ is the angle of the complex value a;

$$\gamma = \sum_{i} D(x2+i)D*(x2+i+N) \quad (i = 0, 1 \ldots, N-1):$$

N is the number of samples in a frame;

the asterisk denotes the complex conjugate;

x2 is the starting point obtained from the fine reference frame search;

In a variant of this point of the technique, it may be useful to average two values of ϵ in order to obtain a more accurate value. A first value of ϵ is obtained by computing the first and second reference frames while the second value is obtained computing the second and third reference frames from the sequence of three reference frames. Such a value of ϵ better represents the frequency offset correction for an average of three consecutive reference frames received over a longer period of time.

Figure 6:
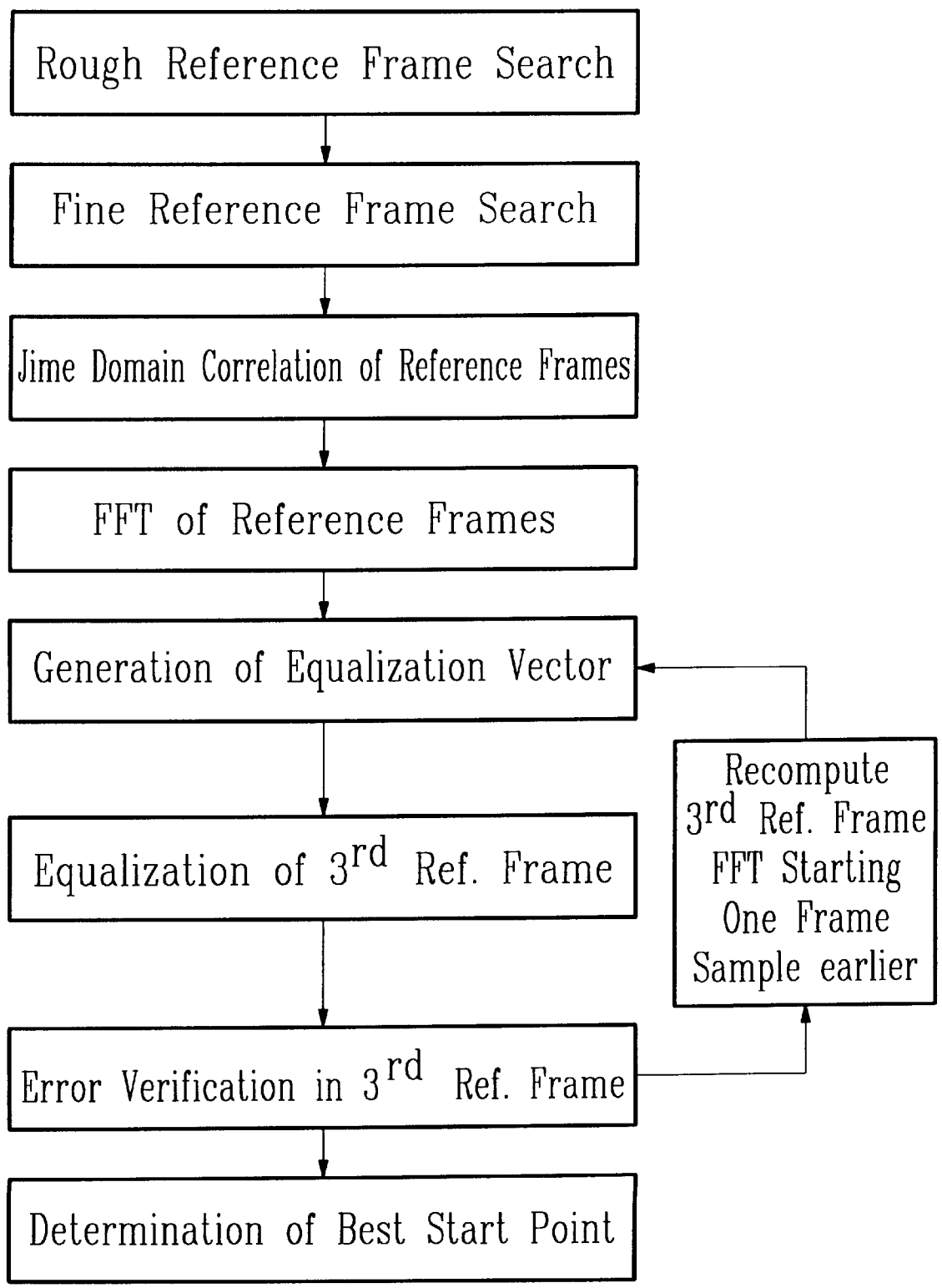
FIG. 6 illustrates a flowchart of the initialization routine of receiver, according to a preferred embodiment of the present invention.

The purpose for the receiver to detect the three reference frames 34 is to use them in order to acquire information about the state of the OFDM channel concerning the current degree of data distortion on that channel. FIG. 6 may be considered a continuation of FIG. 1 and mainly shows a flowchart of the receiver's channel equalization module 50. As data comes into the receiver, frame detection is performed using the window function described above and its variant. The next step after finding the beginning of the reference frame and hence all frames since the CPU can keep track of the input index, is to transform the data into the frequency domain. This is accomplished using an FFT algorithm. The radix-4 method may be used and the processing is done in real-time.

It is to be understood that the previous text described only the preferred embodiment of the present invention. However, other variants of the present method of frame synchronization are also covered by the broad scope of the invention. For example, it is obvious that sequences of other numbers of reference frames may also be used or instead of performing two consecutive searches for the frame synchronization starting point, less or more searches may also be done with the present method. In a broad aspect of the invention, the reference frames may no longer be needed and the frames synchronization may be performed by using the same method of subtracting applied only on the cyclic prefix segments 26. A minimum would then be located that would give the frame synchronization starting point. For better results, the frame synchronization may be improved as frames are received by applying the subtraction function on each incoming cyclic prefix for a period of time.

Channel Equalization

The preferred embodiment of the present invention is an equalization routine for OFDM channels which works on the frequency domain data. An equalization vector employed for equalizing the incoming data bit signal may be updated at each incidence of the three reference frames which occurs every 100 frames approximately. It was mentioned earlier that the incoming data bit signal comprises reference frames 34 that are data known to the receiver and a sample 45 of a reference frame data is hardwired at the receiver's side into a memory 52, such as an EEPROM, onboard the receiver's circuitry. FIG. 8 shows a detailed receiver's channel equalization flowchart. After the reference frames 34 have been located by the frame detection routines, the first step is to turn them into frequency domain, using an FFT module 54. Then, each of the two first reference frames 34 received over the OFDM channel is divided by the accurate reference frame sample 45 contained in the memory 52 and the two results are the inverses of the frequency response of the OFDM channel. The results are averaged and the result is a more accurate correction or equalization vector which represents the average distortion caused by the OFDM channel on two consecutive frames.

In a preferred embodiment of the present invention, instead of performing a usual average between the two vectors, the correlation coefficient is also involved in the mathematical operation in order to counter the problem of the frequency offset, described in detail earlier in this application. The formula used is:

$$V_{eq} = \frac{1}{2}[V_{eq1} + V_{eq2} * \text{EXP}(2\pi i\varepsilon)]$$

wherein Veq is the averaged equalization vector;
Veq1 is the first equalization vector;
Veq2 is the second equalization vector;
i is the imaginary unity;
ε is the correlation coefficient;

This operation results in a more accurate correction vector representing the inverse of the frequency response of the communication channel. Other smoothing algorithms may be applied to this vector in order to filter spurious spikes and noise. The correction vector is then multiplied, component by component to the samples extracted from the third reference frame received inside the sequence of three reference frames, thereby equalizing it and removing the distortion effect of the channel. This corrected third reference frame should then be equal to the accurate reference frame 45 contained in the receiver's memory 52. The verification may be performed more than once before the routine continues, and each time the operation is done and the result is not accurate enough, the FFT start point of the third reference frame in the sequence may be shifted back one sample of data. When a location that result in an accurate equalization vector is found and the equalization vector is generated, that start point with minimum error is used for all subsequent data processing and reading. The final equalization vector is calculated and each subsequent information frame 36 is multiplied by the same equalization vector according to the following algorithm:

$$I_{eqn} = I_n V_{eq} \text{EX}\_(2\pi i \varepsilon n)$$

wherein Ieq is the corrected data frame;
I is the distorted data frame;
Veq is the equalization vector;
ε is the correlation factor;
n=1,1,2, . . . frames away from first reference frame;

The purpose of this operation is both to correct the distortion caused by the OFDM channel on the data frames (by multiplication with the equalization vector Veq) and to correct the frequency offset for the data frames (by multiplication with EXP(i2επ)).

FIG. 6 shows a general functioning flowchart of the receiver initialization routine that is performed each time the receiver is turned on. The purpose of this routine is to locate a best point in time for starting reading the incoming data and from that point, to continue keeping track of the starting points of each incoming frame of data. As it can be seen in FIG. 6, after the two steps of reference frame searching are performed and the starting point of the first sample of the reference frames is found inside a sequence of reference frames, the reference frames are correlated into the time domain for correcting the effect of the frequency offset. Then, an FFT is performed on the reference frames and a first equalization vector is generated according to the method shown in FIG. 8. This vector goes through a plurality of verification involving comparison of the result with the accurate reference frame 45, until a best starting point is found for the subsequent reading of incoming data.

FIG. 7 shows the information frame processing, once the accurate equalization vector has been generated. All incoming information frames go through a process where the cyclic prefix 25 is removed and are then correlated in the time domain for removing the effect of the frequency offset. Then, they all go through an FFT operator and are multiplied by the equalization vector in the manner better explained earlier in this text, for removing the distortion caused on them by the OFDM channel. Finally, the frames are de-mapped and the digital data is output to the receiver data processing unit.

In another preferred embodiment of the present invention, further data verification may be performed at the receiver's side in order to assure that the data is restored in an accurate form. A verification of the condition of the restored information frames may be performed using very small samples of information contained in each information frame 36 and called pilot tones. These pilot tones are very small sequences of data containing information known to the receiver, just like the reference frames. Therefore, after each information frame is corrected using the correcting vector, these pilot tones can be verified and if they begin to drift from their expected values, a feedback signal may be sent in order to update the correction vector using the drift-values of the pilot tones. As mentioned earlier in the present application, once the exact location of the reference frames is found by the rough and fine reference frame search module (when the receiver is first turned on), the equalization vector is then only updated at each incidence of the reference frames, which occurs about once each 100 data frames, and the data frames are updated using the equalization vector, as described above. In some cases, when the OFDM channel distortion is small and constant, the updating of the equalization vector may be performed even more rarely, for example at each third incidence of the sequence of reference frames. The rough reference frame search and the fine reference frame search do not need to be performed anymore, since the exact location of the reference frames is known. This saves time and increases the performance of the receiver.

What is claimed is:

1. A method of frame synchronization for OFDM channels, wherein a frame synchronization starting point is to be located within an incoming data sample stream signal having repeated data samples at predetermined intervals, said method comprising the steps of:

a) subtracting data samples from two points from different frames of said data sample stream signal separated by a predetermined number of data samples defined by a subtraction window function;

b) incrementing said window function with an increment value corresponding to at least one sample;

c) repeating said steps a) and b) until a minimum of a subtraction result thereof is detected said minimum corresponding to substantially identical date samples from said two points; and d) obtaining said frame synchronization starting point from a result of step c).

2. The method of frame synchronization for OFDM channels as claimed in claim 1, wherein said data sample stream signal comprises alternate sequences of reference frames and information frames.

3. The method of frame synchronization for OFDM channels as claimed in claim 2, wherein each of said sequences of reference frames comprises three consecutive reference frames, each said reference frame comprising identical data.

4. The method of frame synchronization for OFDM channels as claimed in claim 3, wherein each of said reference frames and said information frames comprises an individual cyclic prefix composed of a first and a second identical segments of data, wherein said first segment of data is part of a valuable portion of data of said frame and is copied and appended to said valuable portion of data to generate said second segment of data.

5. The method of frame synchronization as claimed in claim 4, wherein a reference frame search is performed for estimating the location of a frame synchronization starting point, wherein said step a) comprises performing a first subtraction on said data samples from said two points being separated by an integral number of frames defined by said subtraction window function;

said step c) comprises detecting a falling edge of said minimum of a result of an application of said first subtraction on a series of data samples including a range from a beginning of a first reference frame of said sequence of reference frames to at least a second reference frame of said sequence, said minimum beginning with said falling edge and ending with a rising edge;

said step d) comprises estimating the location of said frame synchronization starting point at a location of said falling edge.

6. The method of frame synchronization as claimed in claim 5, further comprising the steps of:

e) performing a second subtraction on data samples from two points of a frame separated by a length of said valuable portion of data defined by a further subtraction window function;

f) incrementing said further window function with an increment value corresponding to at least one sample;

g) repeating said steps e) and f) until a minimum of a subtraction result thereof is detected said minimum corresponding to substantially identical data samples from said two points; and h) obtaining a precise location of said minimum detected in said step g) as being a precise frame synchronization starting point.

7. The method of frame synchronization as claimed in claim 1, wherein a frame synchronization is performed for estimating the location of said frame synchronization starting point in said incoming sample stream signal, said signal comprising OFDM frames, wherein said step a) comprises performing a first subtraction on said data samples from said two points being separated by an integral number of frames defined by said subtraction window function;

said step c) comprises detecting a falling edge of said minimum of a result of an application of said first subtraction on a series of data samples including a range from a beginning of a first frame to at least a second frame, said minimum beginning with said falling edge and ending with a rising edge;

said step d) comprises estimating the location of said frame synchronization starting point at a location of said failing edge.

8. The method of frame synchronization as claimed in claim 7, wherein said data sample stream signal comprises OFDM frames, each of said frames comprising an individual cyclic prefix composed of a first and a second identical segments of data, wherein said first segment of data is an end part of a valuable portion of data of said frame and is copied and appended to said valuable portion of data to generate said second segment of data, said method further comprising the steps of:

e) performing a second subtraction on data samples from two points of a frame separated by a length of said valuable portion of data defined by a further subtraction window function;

f) incrementing said further window function with an increment value corresponding to at least one sample;

g) repeating said steps e) and f) until a minimum of a subtraction result thereof is detected said minimum corresponding to substantially identical data samples from said two points; and h) obtaining a precise location of said minimum detected in said step g) as being a precise frame synchronization starting point.

9. The method of frame synchronization for OFDM channels as claimed in claim 8, further comprising the following steps which are performed prior to step a):

i) at a transmitter side, incorporating among said sequences of information frames to be transmitted sequences of reference frames at prescribed regular intervals, each of said sequences of reference frames comprising at least one reference frame of data known to a receiver, each of said at least one reference frame comprising identical data known to said receiver;

i) at said transmitter side, creating said individual cyclic prefix for each frame to be transmitted, said cyclic prefix being composed of said two identical segments of data, wherein either an ending portion of each said frame is copied and appended to a beginning of said each frame, or a beginning portion of said frame is copied and appended to an end of said each frame.

10. A method of channel equalization for point-to-multipoint OFDM channels performed at a receiver side of an OFDM channel, comprising the steps of:

a) receiving an incoming data sample stream signal comprising interleaved sequences of reference and information frames, each of said reference frame containing data known to a receiver;

b) detecting said reference frames in said incoming data sample stream signal of OFDM frames;

c) transforming said incoming stream of OFDM frames from a time domain to a frequency domain;

d) creating a correction vector using said sequence of reference frames and data known to a receiver for correcting broadcast errors created by distortions caused by said OFDM channel;

e) correcting each information frame from said sequences of information frames received at said receiver using said correction vector for countering a distortion effect of said OFDM channel on said frames.

11. The method of channel equalization as claimed in claim 10 further comprising prior to step c) a time domain correlation operation of each incoming pair of reference frames for obtaining an $\epsilon$ factor, wherein said step d) comprises a correction of a frequency offset effect of said OFDM channel using said $\epsilon$ factor.

12. The method of channel equalization as claimed in claim 10, wherein said interleaved sequences of reference and information frames are alternated and have a predetermined number of frames, and step b) is performed by keeping track of a previously located frame synchronization starting point.

13. The method of channel equalization as claimed in claim 12, wherein a frame synchronization operation is performed prior to step b) for locating a frame synchronization starting point within said incoming stream of OFDM frames, said frame synchronization comprising the steps of:

f) subtracting data samples from two points of said data sample stream signal separated by a predetermined number of data samples defined by a subtraction window function;

g) incrementing said window function with in increment value corresponding to at least one sample;

h) repeating said steps f) and g) until a minimum of a subtraction result thereof is detected said minimum corresponding to substantially identical data samples from said two points; and i) obtaining said frame synchronization starting point from a result of step h).

14. The method of channel equalization as claimed in claim 13, wherein each of said sequences of reference frames comprises three consecutive reference frames, each said reference frame comprising identical data.

15. The method of channel equalization as claimed in claim 14, wherein each of said reference frames and said information frames comprises an individual cyclic prefix composed of a first and a second identical segments of data, wherein said first segment of data is part of a valuable portion of data of said frame and is copied and appended to said valuable portion of data to generate said second segment of data.

16. The method of channel equalization as claimed in claim 15, wherein a reference frame search is performed for estimating the location of a frame synchronization starting point, wherein said step f) comprises performing a first subtraction on said data samples from said two points being separated by an integral number of frames defined by said subtraction window function;

said step h) comprises detecting a falling edge of said minimum of a result of an application of said first subtraction on a series of data samples including a range from a beginning of a first frame to at least a second frame, said minimum beginning with said falling edge and ending with a rising edge;

said step i) comprises estimating the location of said frame synchronization starting point at a location of said falling edge.

17. The method of channel equalization as claimed in claim 16, wherein said data sample stream signal comprises OFDM frames, each of said frames comprising an individual cyclic prefix composed of a first and a second identical segments of data, wherein said first segment of data is an end part of a valuable portion of data of said frame and is copied and appended to said valuable portion of data to generate said second segment of data, said method further comprising the steps of:

j) performing a second subtraction on data samples from two points of a frame separated by a length of said valuable portion of data defined by a further subtraction window function;

k) incrementing said further window function with an increment value corresponding to at least one sample;

l) repeating said steps j) and k) until a minimum of a subtraction result thereof is detected said minimum corresponding to substantially identical data samples from said two points; and m) obtaining a precise location of said minimum detected in said step l) as being a precise frame synchronization starting point.

18. The method of channel equalization as claimed in claim 10, wherein said sequence of reference frames comprises at least one reference frame and wherein step d) comprises performing for at least one reference frame of said sequence of reference frames a division of a first reference frame from said sequence by said data known to said receiver stored at said receiver side and obtaining at least one quotient representing at least one equalization vector representing an inverse of a frequency response of said OFDM channel.

19. The method of channel equalization as claimed in claim 18, wherein when more than one equalization vector is obtained, an average of all equalization vectors is computed for obtaining an averaged equalization vector.

20. The method of channel equalization as claimed in claim 19, wherein each of said reference and information frames comprises a cyclic prefix composed of a first and a second identical segments of data, wherein said first segment of data is an end part of a valuable portion of data of said frame and is copied and appended to said valuable portion of data to generate said second segment of data;

said step c) uses a frame synchronization starting point within said cyclic prefix for transforming said incoming stream of OFDM frames from a time domain to a frequency domain.

21. The method of channel equalization as claimed in claim 20, further comprising the step of:

verifying an accuracy of said average of all equalization vectors by following the steps of:

performing a multiplication of said averaged equalization vector with a last reference frame from said sequence of reference frames, said last reference frame having not being used for prior computing of said equalization vectors, wherein said result represents an equalized or corrected said last reference frame, whereby the corrected reference frame should be equal to said data known to said receiver;

comparing said result with said data known to said receiver for computing an accuracy of said averaged equalization vector;

moving said frame synchronization starting point within said cyclic prefix and using new data read from a new location for creating a new averaged equalization vector, using previous steps.

22. The method of channel equalization as claimed in claim 12 wherein said sequence of reference frames comprises three reference frames and each of said reference and information frames comprises a cyclic prefix composed of a first and a second identical segments of data, wherein said first segment of data is part of a valuable portion of data of said frame and is copied and appended to said valuable portion of data to generate said second segment of data, and wherein said step c) uses a frame synchronization starting point within said cyclic prefix for transforming said incoming stream of OFDM frames from a time domain to a frequency domain.

23. The method of channel equalization as claimed in claim 22 wherein step d) comprises the steps of:

dividing a first reference frame from said sequence of reference frames by said data known to said receiver stored at said receiver side and obtaining at a first quotient representing a first inverse of a frequency response of said OFDM channel which is a first equalization vector for said OFDM channel;

dividing a second reference frames from said sequence of reference frames by said data known to said receiver stored at said receiver and obtaining at a second quotient representing a second inverse of a frequency response of said OFDM channel which is a first equalization vector for said OFDM channel;

computing an average of said first quotient and second quotient, said average representing an equalization vector of said OFDM channel;

verifying an accuracy of said equalization vector by comparing a result of a multiplication of said vector with a third reference frame form said sequence of reference frames, with said data known to said receiver, said result representing an equalized or corrected reference frame, whereby said corrected reference frame should be equal to said data known to said receiver;

moving said frame synchronization starting point within said cyclic prefix and using new data read from a new location for creating a new averaged equalization vector, using previous steps.

\* \* \* \* \*